(12) United States Patent
Scharf et al.

(10) Patent No.: US 9,450,926 B2
(45) Date of Patent: Sep. 20, 2016

(54) UPLOAD AND DOWNLOAD STREAMING ENCRYPTION TO/FROM A CLOUD-BASED PLATFORM

(71) Applicant: Box, Inc., Los Altos, CA (US)

(72) Inventors: Yuval Scharf, Los Altos, CA (US); James P. Lyons, San Mateo, CA (US)

(73) Assignee: Box, Inc., Redwood City, CA (US)

( * ) Notice: Subject to any disclaimer, the term of this patent is extended or adjusted under 35 U.S.C. 154(b) by 0 days.

(21) Appl. No.: 14/851,798

(22) Filed: Sep. 11, 2015

(65) Prior Publication Data

US 2015/0381587 A1  Dec. 31, 2015

Related U.S. Application Data

(62) Division of application No. 13/975,827, filed on Aug. 26, 2013, now Pat. No. 9,135,462.

(60) Provisional application No. 61/694,492, filed on Aug. 29, 2012.

(51) Int. Cl.
  *H04L 29/06* (2006.01)
  *G06F 21/62* (2013.01)
  (Continued)

(52) U.S. Cl.
  CPC ....... *H04L 63/0428* (2013.01); *G06F 21/6209* (2013.01); *G06F 21/6218* (2013.01); *H04L 9/0838* (2013.01); *H04L 9/0894* (2013.01); *H04L 67/06* (2013.01); *G06F 2221/2149* (2013.01)

(58) Field of Classification Search
  CPC ........... H04L 63/0428; H04L 63/0424; H04L 67/06; G06F 2221/2107; G06F 21/10; G06F 21/62; G06F 21/6209; G06F 21/6218

USPC ......................................................... 713/165
See application file for complete search history.

(56) References Cited

U.S. PATENT DOCUMENTS

| 858,619 A |   | 7/1907 | O'Farrell |
|---|---|---|---|
| 4,588,991 A | * | 5/1986 | Atalla ................. G06F 12/1408 235/382 |

(Continued)

FOREIGN PATENT DOCUMENTS

| CA | 2724521 A1 | 11/2009 |
|---|---|---|
| CN | 101997924 A | 3/2011 |

(Continued)

OTHER PUBLICATIONS

International Search Report and Written Opinion for PCT/US2008/012973 dated Apr. 30, 2009, pp. 1-11.

(Continued)

*Primary Examiner* — Hadi Armouche
*Assistant Examiner* — Shahriar Zarrineh
(74) *Attorney, Agent, or Firm* — Perkins Coie LLP

(57) ABSTRACT

Embodiments of the present disclosure include systems and methods for upload and/or download streaming encryption to/from an online service, or cloud-based platform or environment. The encryption process includes the following parts: Upload encryption, download decryption, and a central piece of infrastructure called the Interval Key Server (IKS). During both upload and download, the encryption and decryption processes are performed while the files are being uploaded/downloaded, (e.g., the files are being encrypted/decrypted as they are being streamed).

15 Claims, 9 Drawing Sheets

(51) Int. Cl.
  *H04L 9/08* (2006.01)
  *H04L 29/08* (2006.01)

(56) References Cited

U.S. PATENT DOCUMENTS

| | | | |
|---|---|---|---|
| 5,481,610 A * | 1/1996 | Doiron | H04L 9/0894 380/270 |
| 5,604,800 A * | 2/1997 | Johnson | G06F 21/34 38/23 |
| 5,748,735 A | 5/1998 | Ganesan | |
| 5,787,175 A | 7/1998 | Carter | |
| 5,799,320 A | 8/1998 | Klug | |
| 5,848,415 A | 12/1998 | Guck | |
| 5,864,870 A | 1/1999 | Guck | |
| 5,999,908 A | 12/1999 | Abelow | |
| 6,016,467 A | 1/2000 | Newsted et al. | |
| 6,034,621 A | 3/2000 | Kaufman | |
| 6,055,543 A | 4/2000 | Christensen et al. | |
| 6,073,161 A | 6/2000 | DeBoskey et al. | |
| 6,098,078 A | 8/2000 | Gehani et al. | |
| 6,226,618 B1 * | 5/2001 | Downs | G06F 21/10 380/279 |
| 6,233,600 B1 | 5/2001 | Salas et al. | |
| 6,260,040 B1 | 7/2001 | Kauffman et al. | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 | 1/2002 | Kumar et al. | |
| 6,345,386 B1 | 2/2002 | Delo et al. | |
| 6,370,543 B2 | 4/2002 | Hoffert et al. | |
| 6,374,260 B1 | 4/2002 | Hoffert et al. | |
| 6,385,606 B2 | 5/2002 | Inohara et al. | |
| 6,396,593 B1 | 5/2002 | Laverty et al. | |
| 6,441,641 B1 | 8/2002 | Pang et al. | |
| 6,515,681 B1 | 2/2003 | Knight | |
| 6,539,381 B1 | 3/2003 | Prasad et al. | |
| 6,584,466 B1 | 6/2003 | Serbinis et al. | |
| 6,636,872 B1 | 10/2003 | Heath et al. | |
| 6,636,897 B1 | 10/2003 | Sherman et al. | |
| 6,654,737 B1 | 11/2003 | Nunez | |
| 6,662,186 B1 | 12/2003 | Esquibel et al. | |
| 6,687,878 B1 | 2/2004 | Eintracht et al. | |
| 6,714,968 B1 | 3/2004 | Prust | |
| 6,735,623 B1 | 5/2004 | Prust | |
| 6,742,181 B1 | 5/2004 | Koike et al. | |
| 6,760,721 B1 | 7/2004 | Chasen et al. | |
| 6,947,162 B2 | 9/2005 | Rosenberg et al. | |
| 6,952,724 B2 | 10/2005 | Prust | |
| 6,996,768 B1 | 2/2006 | Elo et al. | |
| 7,003,667 B1 | 2/2006 | Slick et al. | |
| 7,010,752 B2 | 3/2006 | Ly | |
| 7,020,697 B1 | 3/2006 | Goodman et al. | |
| 7,039,806 B1 | 5/2006 | Friedman et al. | |
| 7,069,393 B2 | 6/2006 | Miyata et al. | |
| 7,130,831 B2 | 10/2006 | Howard et al. | |
| 7,133,834 B1 | 11/2006 | Abelow | |
| 7,143,136 B1 | 11/2006 | Drenan et al. | |
| 7,149,787 B1 | 12/2006 | Mutalik et al. | |
| 7,152,182 B2 | 12/2006 | Ji et al. | |
| 7,155,483 B1 | 12/2006 | Friend et al. | |
| 7,165,107 B2 | 1/2007 | Pouyoul et al. | |
| 7,178,021 B1 | 2/2007 | Hanna et al. | |
| 7,222,078 B2 | 5/2007 | Abelow | |
| 7,231,516 B1 * | 6/2007 | Sparrell | H04N 5/783 348/E7.056 |
| 7,275,244 B1 | 9/2007 | Charles Bell et al. | |
| 7,296,025 B2 | 11/2007 | Kung et al. | |
| 7,346,778 B1 | 3/2008 | Guiter et al. | |
| 7,353,252 B1 | 4/2008 | Yang et al. | |
| 7,362,868 B2 | 4/2008 | Madoukh et al. | |
| 7,363,330 B1 | 4/2008 | Ellman et al. | |
| 7,370,269 B1 | 5/2008 | Prabhu et al. | |
| 7,386,535 B1 | 6/2008 | Kalucha et al. | |
| 7,401,117 B2 | 7/2008 | Dan et al. | |
| 7,543,000 B2 | 6/2009 | Castro et al. | |
| 7,581,221 B2 | 8/2009 | Lai et al. | |
| 7,620,565 B2 | 11/2009 | Abelow | |
| 7,647,559 B2 | 1/2010 | Yozell-Epstein et al. | |
| 7,650,367 B2 | 1/2010 | Arruza | |
| 7,661,088 B2 | 2/2010 | Burke | |
| 7,665,093 B2 | 2/2010 | Maybee et al. | |
| 7,676,542 B2 | 3/2010 | Moser et al. | |
| 7,698,363 B2 | 4/2010 | Dan et al. | |
| 7,734,600 B1 | 6/2010 | Wise et al. | |
| 7,756,843 B1 | 7/2010 | Palmer | |
| 7,774,412 B1 | 8/2010 | Schnepel | |
| 7,814,426 B2 | 10/2010 | Huesken et al. | |
| 7,886,287 B1 | 2/2011 | Davda | |
| 7,886,295 B2 | 2/2011 | Burger et al. | |
| 7,890,964 B2 | 2/2011 | Vogler-Ivashchanka et al. | |
| 7,937,663 B2 | 5/2011 | Parker et al. | |
| 7,958,353 B2 | 6/2011 | Matsuzaki et al. | |
| 7,958,453 B1 | 6/2011 | Taing | |
| 7,979,296 B2 | 7/2011 | Kruse et al. | |
| 7,996,374 B1 | 8/2011 | Jones et al. | |
| 8,027,976 B1 | 9/2011 | Ding et al. | |
| RE42,904 E | 11/2011 | Stephens, Jr. | |
| 8,065,739 B1 | 11/2011 | Bruening et al. | |
| 8,090,361 B2 | 1/2012 | Hagan | |
| 8,103,662 B2 | 1/2012 | Eagan et al. | |
| 8,117,261 B2 | 2/2012 | Briere et al. | |
| 8,140,513 B2 | 3/2012 | Ghods et al. | |
| 8,151,183 B2 | 4/2012 | Chen et al. | |
| 8,185,830 B2 | 5/2012 | Saha et al. | |
| 8,200,582 B1 | 6/2012 | Zhu | |
| 8,214,747 B1 | 7/2012 | Yankovich et al. | |
| 8,224,934 B1 | 7/2012 | Dongre et al. | |
| 8,230,348 B2 | 7/2012 | Peters et al. | |
| 8,239,918 B1 | 8/2012 | Cohen | |
| 8,326,814 B2 | 12/2012 | Ghods et al. | |
| 8,347,276 B2 | 1/2013 | Schadow | |
| 8,358,701 B2 | 1/2013 | Chou et al. | |
| 8,370,803 B1 | 2/2013 | Holler et al. | |
| 8,429,540 B1 | 4/2013 | Yankovich et al. | |
| 8,464,161 B2 | 6/2013 | Giles et al. | |
| 8,515,902 B2 | 8/2013 | Savage | |
| 8,527,549 B2 | 9/2013 | Cidon | |
| 8,549,066 B1 | 10/2013 | Donahue et al. | |
| 8,549,511 B2 | 10/2013 | Seki et al. | |
| 8,582,777 B2 | 11/2013 | Urivskiy et al. | |
| 8,583,619 B2 | 11/2013 | Ghods et al. | |
| 8,607,306 B1 | 12/2013 | Bridge et al. | |
| 8,620,578 B1 | 12/2013 | Brown et al. | |
| 8,650,498 B1 | 2/2014 | Mihovilovic | |
| 8,719,445 B2 | 5/2014 | Ko | |
| 8,745,267 B2 | 6/2014 | Luecke et al. | |
| 8,825,597 B1 | 9/2014 | Houston et al. | |
| 8,849,955 B2 | 9/2014 | Prahlad et al. | |
| 8,868,574 B2 | 10/2014 | Kiang et al. | |
| 8,892,679 B1 | 11/2014 | Destagnol et al. | |
| 8,914,856 B1 | 12/2014 | Velummylum et al. | |
| 8,914,900 B2 | 12/2014 | Smith et al. | |
| 8,918,387 B1 | 12/2014 | Sokolov | |
| 8,949,939 B2 | 2/2015 | Peddada | |
| 8,959,579 B2 | 2/2015 | Barton et al. | |
| 8,966,062 B1 | 2/2015 | Giese et al. | |
| 8,990,955 B2 | 3/2015 | Hymel et al. | |
| 9,019,123 B2 | 4/2015 | Boulanger et al. | |
| 9,021,099 B2 | 4/2015 | Ko | |
| 9,027,108 B2 | 5/2015 | Tan et al. | |
| 9,037,870 B1 * | 5/2015 | Zheng | G06F 12/1408 380/273 |
| 9,054,919 B2 | 6/2015 | Kiang et al. | |
| 9,117,087 B2 | 8/2015 | Tan et al. | |
| 9,135,462 B2 | 9/2015 | Scharf et al. | |
| 9,195,519 B2 | 11/2015 | Tan et al. | |
| 9,280,613 B2 | 3/2016 | Smith et al. | |
| 2001/0027492 A1 | 10/2001 | Gupta | |
| 2002/0029218 A1 | 3/2002 | Bentley et al. | |
| 2002/0062218 A1 | 5/2002 | Pianin | |
| 2002/0091738 A1 | 7/2002 | Rohrabaugh et al. | |
| 2002/0099772 A1 | 7/2002 | Deshpande et al. | |
| 2002/0116544 A1 | 8/2002 | Barnard et al. | |
| 2002/0133509 A1 | 9/2002 | Johnston et al. | |

(56) References Cited

U.S. PATENT DOCUMENTS

| | | |
|---|---|---|
| 2002/0147770 A1 | 10/2002 | Tang |
| 2002/0194177 A1 | 12/2002 | Sherman et al. |
| 2003/0041095 A1 | 2/2003 | Konda et al. |
| 2003/0046572 A1* | 3/2003 | Newman ............ G06F 21/6227 |
| | | 713/193 |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0021686 A1 | 2/2004 | Barberis |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0038997 A1 | 2/2005 | Kojima et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0239447 A1 | 10/2005 | Holzman et al. |
| 2005/0261933 A1 | 11/2005 | Magnuson |
| 2005/0283800 A1 | 12/2005 | Ellis et al. |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0092049 A1* | 5/2006 | Dellow ................ G06F 21/79 |
| | | 341/50 |
| 2006/0093150 A1* | 5/2006 | Reddy ................ H04L 9/0825 |
| | | 380/282 |
| 2006/0095526 A1 | 5/2006 | Levergood et al. |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011261 A1 | 1/2007 | Madams et al. |
| 2007/0016680 A1 | 1/2007 | Burd et al. |
| 2007/0038934 A1 | 2/2007 | Fellman |
| 2007/0050635 A1 | 3/2007 | Popp |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0192630 A1 | 8/2007 | Crane et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0141381 A1* | 6/2008 | Walkoe ................ G06F 21/10 |
| | | 726/28 |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2008/0317242 A1* | 12/2008 | Bohush ................ H04L 9/16 |
| | | 380/28 |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |

(56) References Cited

U.S. PATENT DOCUMENTS

| | | |
|---|---|---|
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0085761 A1* | 4/2009 | Buer ................ G06Q 20/4016 340/686.1 |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | Fitzgerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1* | 11/2010 | Banks ................ G06F 21/6227 380/277 |
| 2010/0306379 A1 | 12/2010 | Ferris |
| 2010/0306547 A1 | 12/2010 | Fallows et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1* | 5/2011 | Eng ........................ G06Q 10/10 713/155 |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0197156 A1 | 8/2011 | Strait et al. |
| 2011/0202424 A1 | 8/2011 | Chun et al. |
| 2011/0202599 A1 | 8/2011 | Yuan et al. |
| 2011/0207436 A1 | 8/2011 | Van Gent et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |

(56) References Cited

U.S. PATENT DOCUMENTS

| | | |
|---|---|---|
| 2011/0320197 A1 | 12/2011 | Conejero et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1* | 9/2012 | Purohit .............. H04L 1/04 380/255 |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007074 A1 | 1/2013 | Weicher |
| 2013/0007245 A1 | 1/2013 | Malik et al. |
| 2013/0007464 A1* | 1/2013 | Madden ............ G06F 21/6218 713/179 |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0159707 A1 | 6/2013 | Jogand-Coulomb et al. |
| 2013/0163289 A1 | 6/2013 | Kim et al. |
| 2013/0166914 A1* | 6/2013 | Vandervort .......... H04L 9/3247 713/176 |
| 2013/0167253 A1 | 6/2013 | Seleznev et al. |
| 2013/0173916 A1* | 7/2013 | Sato ................. G06F 21/6218 713/165 |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198474 A1 | 8/2013 | Shaath |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0311894 A1 | 11/2013 | Rexer et al. |
| 2013/0318586 A1 | 11/2013 | Smith et al. |
| 2013/0326344 A1 | 12/2013 | Masselle et al. |
| 2013/0347070 A1 | 12/2013 | Cairns et al. |
| 2014/0007205 A1 | 1/2014 | Oikonomou |
| 2014/0013104 A1 | 1/2014 | Vinnik et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0082091 A1 | 3/2014 | Rexer |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0259190 A1 | 9/2014 | Kiang et al. |
| 2014/0270178 A1 | 9/2014 | Kiang et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |
| 2015/0200948 A1 | 7/2015 | Cairns et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |

(56) References Cited

FOREIGN PATENT DOCUMENTS

| | | |
|---|---|---|
| JP | 2008250944 | 10/2008 |
| KR | 20020017444 A | 3/2002 |
| KR | 20040028036 | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-2002019128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 A1 | 11/2013 |

OTHER PUBLICATIONS

Supplementary European Search Report European Application No. EP 08 85 8563 dated Jun. 20, 2011 pp. 1-5.
International Search Report and Written Opinion for PCT/US2011/039126 mailed on Oct. 6, 2011, pp. 1-13.
Partial International Search Report for PCT/US2011/041308 dated Feb. 27, 2012, pp. 1-2.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
International Search Report and Written Opinion for PCT/US2011/060875 Mailed Oct. 30, 2012, pp. 1-10.
Internet Forums, http://web.archiye.org/web/20100528195550/http://en.wikipedia.org/wiki/Internet_forums, Wikipedia, May 30, 2010, pp. 1-20.
Yahoo! Groups, http://web.archiye.org/web/20090320101529/http://en.wikipedia.org/wiki/Yahool_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2012/070366, Applicant: Box, Inc., Mailed Apr. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 11 pages.
International Search Report and Written Opinion for PCT/US2013/039782, Applicant: Box, Inc., Mailed Aug. 28, 2013, 15 pages.
Exam Report for GB1313559.5, Applicant: Box, Inc., Mailed Aug. 22, 2013, 19 pages.
Exam Report for GB1310666.1, Applicant: Box, Inc. Mailed Aug. 30, 2013, 10 pages.
Google Docs, http://web. Archive.org/web/20100413105758/http://en.wikipedia.org/wiki/Google_docs, Apr. 13, 2010, 6 pages.
Exam Report for GB1316533.7, Applicant: Box, Inc. Mailed Oct. 8, 2013, 9 pages.
Exam Report for GB1309209.3, Applicant: Box, Inc. Mailed Oct. 30, 2013, 11 pages.
"Quickoffice Enhances Android Mobile office Application for Improved Productivity on latest Smartphone and Table Devices," QuickOffice Press Release, Nov. 21, 2011, QuickOffice Inc., 2 pages.
"PaperPort," Wikipedia article (old revision), published May 19, 2012, Wikipedia Foundation, 2 pages.
"PaperPort Professional 14," PC Mag. Com review, published Feb. 2012, Ziff Davis, Inc., 8 pages.
"QuickOffice," Wikipedia Article (old revision), published May 9, 2012, Wikipedia Foundation, 2 pages.
Exam Report for GB1316532.9, Applicant: Box, Inc. Mailed Oct. 31, 2013, 10 pages.
Gedymin, "Cloud computing with an emphasis on Google App Engine," Master Final Project, Sep. 2011, 146 pages.
Exam Report for GB1317600.3, Applicant: Box, Inc. Mailed Nov. 21, 2013, 8 pages.
Exam Report for EP13168784.0, Applicant: Box, Inc. Mailed Nov. 21, 2013, 7 pages.
Exam Report for GB1316971.9, Applicant: Box, Inc. Mailed Nov. 26, 2013, 10 pages.
Exam Report for GB1312095.1, Applicant: Box, Inc. Mailed Dec. 12, 2013, 7 pages.
Exam Report for GB1318373.6, Applicant: Box, Inc. Mailed Dec. 17, 2013, 4 pages.
Exam Report for GB1312874.9, Applicant: Box, Inc. Mailed Dec. 20, 2013, 11 pages.

(56) References Cited

OTHER PUBLICATIONS

Exam Report for GB1320902.8, Applicant: Box, Inc. Mailed Dec. 20, 2013, 6 pages.
Patent Court Document of Approved Judgment for GB0602349.3 and GB0623571.7; Mar. 3, 2009, 17 pages.
Exam Report for GB1311417.8, Applicant: Box, Inc. Mailed Dec. 23, 2013, 5 pages.
International Search Report and Written Opinion for PCT/US2013/034765, Applicant: Box, Inc., Mailed Jan. 20, 2014, 15 pages.
Exam Report for EP13185269.1, Applicant: Box, Inc. Mailed Jan. 28, 7 pages.
Exam Report for GB1314771.5, Applicant: Box, Inc. Mailed Feb. 17, 2014, 7 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. Mailed Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1312264.3, Applicant: Box, Inc. Mailed Mar. 24, 2014, 7 pages.
Search Report for EP14153783.7, Applicant: Box, Inc. Mailed Apr. 7, 2014, 6 pages.
John et al., "Always Sync Support Forums—View topic—Allway sync funny behavior," Allway Sync Support Forum at http://sync-center.com, Mar. 28, 2011, XP055109680, 2 pages.
Search Report for EP14151588.2, Applicant: Box, Inc. Mailed Apr. 15, 2014, 12 pages.
Search Report for EP13187217.8, Applicant: Box, Inc. Mailed Apr. 15, 2014, 12 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Walker, "PDF.js project meeting notes," retrieved from the internet, http://groups.google.com, May 15, 2014, 1 page.
Sommerer, "Presentable Document Format: Improved On-demand PDF to HTML Conversion," retrieved from the internet, http://research.microsoft.com, Nov. 2004, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest, retrieved from the internet," http://twitter.com, Oct. 12, 2012, 2 pages.
Cohen, "Debating the Definition of Cloud Computing Platforms," retrieved from the internet, http://forbes.com, Feb. 3, 2014, 7 pages.
Partial Search Report for EP131832800, Applicant: Box, Inc. Mailed May 8, 2014, 5 pages.
Search Report for EP141509422, Applicant: Box, Inc. Mailed May 8, 2014, 7 pages.
Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web. Archive.org/web, 3 pages.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.
Exam Report for GB1410569.6 Applicant: Box, Inc. Mailed Jul. 11, 2014, 9 pages.
Extended Search Report for EP131832800, Applicant: Box, Inc. Mailed Aug. 25, 2014, 7 pages.
Extended Search Report for EP141509422, Applicant: Box, Inc. Mailed Aug. 26, 2014, 12pages.
Search Report for EP 13189144.2 Applicant: Box, Inc. Mailed Sep. 1, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for Smart Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3—Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Exam Report for GB1316532.9 Applicant: Box, Inc. Mailed Mar. 27, 2015, 6 pages.
Burney, "How to Move Document from Your Computer to Your iPad and Back Again," May 31, 2011, 3 pages.
Exam Report for GB1311459.0 Applicant: Box, Inc. Mailed Aug. 19, 2013, 6 pages.

(56) References Cited

OTHER PUBLICATIONS

"Dropbox: Sync only specific folders," posted on Feb. 9, 2012, available online at http://www.tech-recipes.com/rx/20865/dropbox-sync-only-specific-folders/, 4 pages.
No Stated Author, Amazon Simple Storage Services FAQs, 2012, https://web.archive.org.web/20120615092600/http://aws.amazon.com/s3/faqs/>; pp. 1-14.
Mogull, "DLP Content Discovery: Best Practices for Stored Data Discovery and Protection," 2009, pp. 1-16.
No Stated Author, "CheckPoint Virtual Appliance for Amazon Web Services," 2012, pp. 1-6.
Exam Report for GB1309209.3; Applicant: Box, Inc. Mailed Jul. 15, 2015, 8 pages.
International Search Report and Written Opinion for PCT/US2013/035404, Applicant: Box, Inc., Mailed Jun. 26, 2013, 13 pages.
Exam Report for GB1320902.8, Applicant: Box, Inc. Mailed Dec. 20, 2013, 4 pages.
Exam Report for GB1311417.8, Applicant: Box, Inc. Mailed Dec. 20, 2013, 5 pages.
Wei, et al., "Managing Security of Virtual Machine Images in a Cloud Environment," CCSW'09, Nov. 13, 2009, pp. 91-96.

* cited by examiner

UPLOAD AND DOWNLOAD STREAMING ENCRYPTION TO/FROM A CLOUD-BASED PLATFORM

CROSS-REFERENCE TO RELATED APPLICATIONS AND EFFECTIVE FILING DATE ENTITLEMENT

This application is a divisional application of U.S. application Ser. No. 13/975,827, entitled "UPLOAD AND DOWNLOAD STREAMING ENCRYPTION TO/FROM A CLOUD-BASED PLATFORM", filed Aug. 26, 2013, which claims priority to and the benefit of U.S. Provisional Application 61/694,492, entitled UPLOAD AND DOWNLOAD STREAMING ENCRYPTION TO/FROM A CLOUD-BASED PLATFORM, filed on Aug. 29, 2012, which is hereby incorporated by reference in its entirety. This application is therefore entitled to an effective filing date of Aug. 29, 2012.

BACKGROUND

Collaborative online or cloud-based environments, such as collaborative file sharing environments, require dependable and secure encryption systems. Absent such dependable systems, users may be reluctant to exchange sensitive documents via the environment. Unfortunately, security breaches are often a reality in the digital era, where even the best encryption systems may be compromised because of a malicious employee, a careless administrator, etc.

Accordingly, there exists a need for a collaborative file sharing and/or storage system that facilitates improved encryption methods and improved recovery methods to respond to a security breach.

BRIEF DESCRIPTION OF THE DRAWINGS

Examples of a web-based collaboration platform that can synchronize a workspace or folder stored at a server with folders on the computer of one or more collaborators of the workspace or folder while employing some encryption techniques are illustrated in various of the figures. The examples and figures are illustrative rather than limiting.

Figure 1:
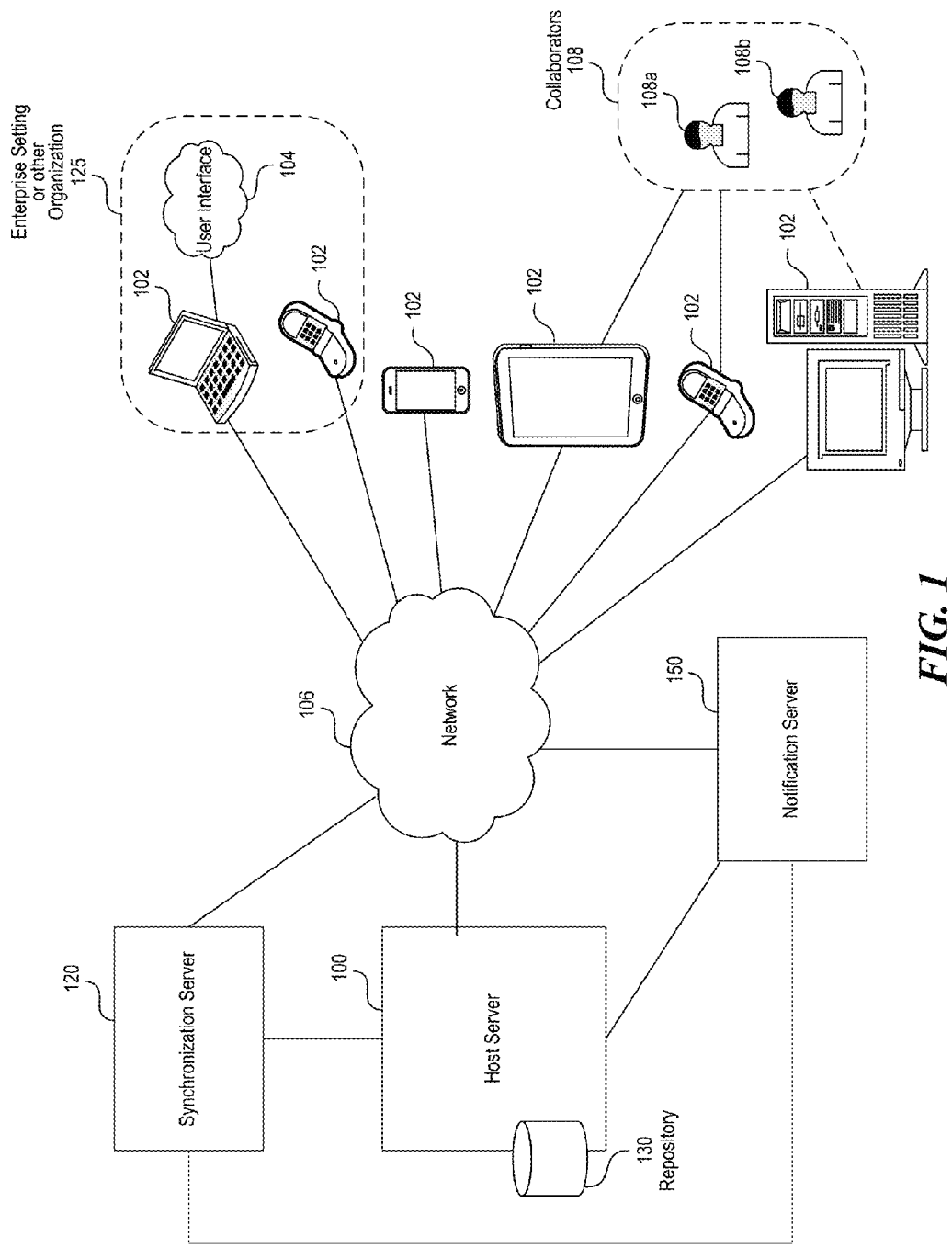
FIG. 1 illustrates an example diagram of a system where a synchronization server supports synchronization between folders in an cloud-based environment and folders on a local computer in some embodiments.

Those skilled in the art will appreciate that the logic and process steps illustrated in the various flow diagrams discussed below, may be altered in a variety of ways. For example, the order of the logic may be rearranged, substeps may be performed in parallel, illustrated logic may be omitted, other logic may be included, etc. One will recognize that some steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

DETAILED DESCRIPTION

The following description and drawings are illustrative and are not to be construed as limiting. Numerous specific details are described to provide a thorough understanding of the disclosure. However, in some instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Some terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

System Overview

Embodiments of the present disclosure include systems and methods for upload and/or download streaming encryption to/from an online service, or cloud-based platform or environment.

FIG. 1 illustrates an example diagram of a system where a host server 100 and notification server 150 provide notifications of activities that occur in the cloud-based environment in real time or near real time to users 108. Further, sync server 120 supports synchronization of folders stored locally on a user's computer with folders stored by the host server 100 in repository 130.

The client devices 102 can be any system and/or device, and/or any combination of devices/systems that is able to establish a connection, including wired, wireless, cellular connections with another device, a server and/or other systems such as host server 100 and/or notification server 150 and/or sync server 120. Client devices 102 can include a synchronization client program to synchronize a local copy of a folder with a copy of a folder stored on the web-based collaboration environment server.

Client devices 102 may typically include a display and/or other output functionalities to present information and data exchanged between or among the devices 102 and/or the host server 100 and/or notification server 150 and/or the synchronization server 120.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, wearable devices (e.g., mobile enabled watches, glasses such as a Google glass, a network or mobile enabled glass, or Apple watch or any network or mobile enabled wrist watch, etc.) In one embodiment, the client devices 102, host server 100, notification server 150, and synchronization server 120 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or cloud-based platform (e.g., hosted by the host server 100).

The collaboration platform or environment hosts workspaces with work items that one or more users can access (e.g., view, edit, update, revise, comment, add to discussions, download, preview, tag, or otherwise manipulate, etc.). A work item can generally include any type of digital or electronic content that can be viewed or accessed via an electronic device (e.g., device 102). The digital content can include .PDF files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example. The workspace can also include an online discussion area for collaborators to enter comments linked to a particular workspace or folder.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate on efforts on work items such that each user can see, remotely, edits, revisions, comments, or annotations being made to specific work items through their own user devices. For example, a user can upload a document to a work space for other users to access (e.g., for viewing, editing, commenting, discussing, signing-off, or otherwise manipulating). The user can login to the online platform and upload the document (or any other type of work item) to an existing work space or to a new work space. The document can be shared with existing users or collaborators in a work space.

Figure 2:
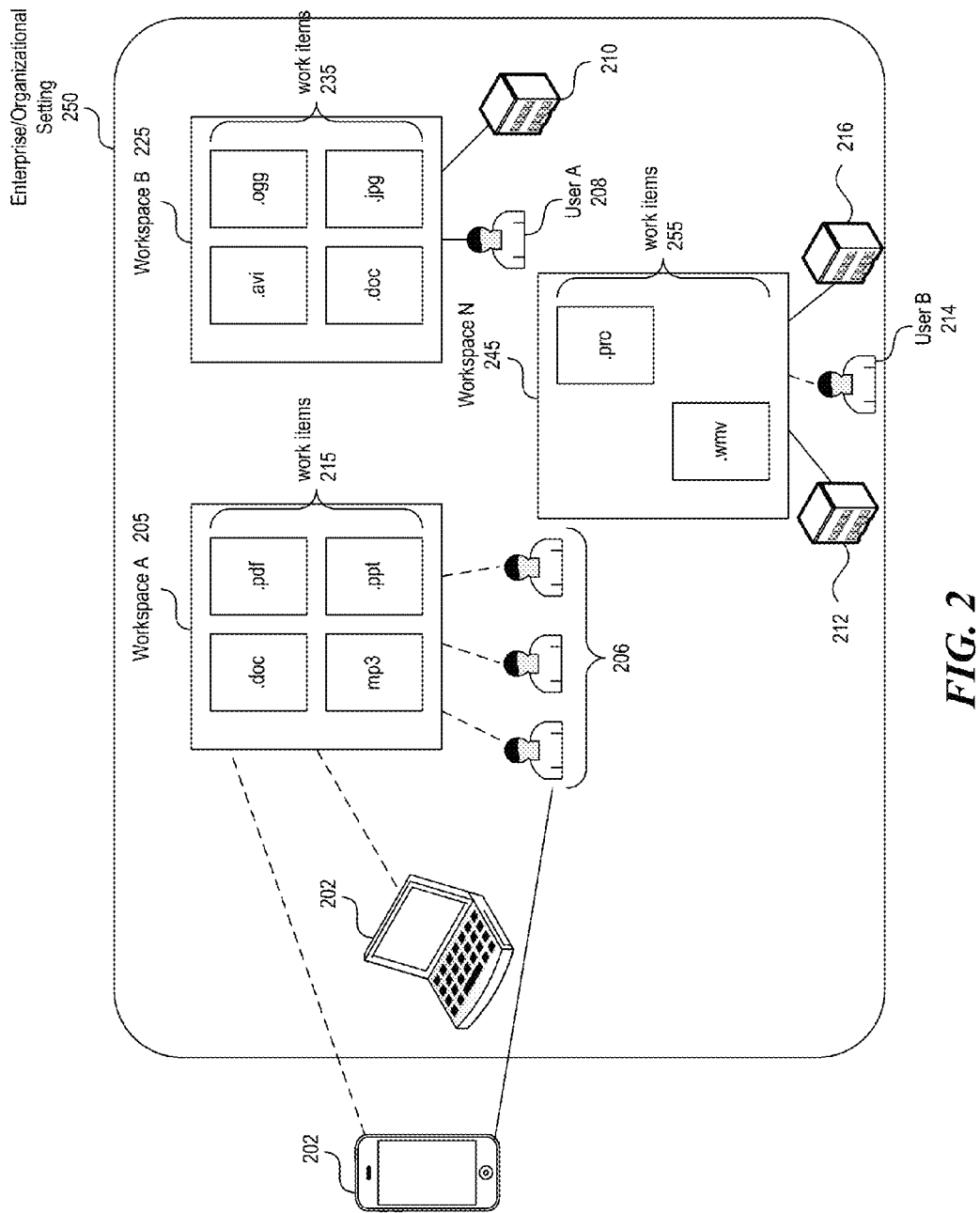
FIG. 2 depicts an example diagram of a web-based or cloud-based platform deployed in an enterprise or other organizational setting for organizing work items and workspaces in some embodiments.

A diagrammatic illustration of the cloud-based environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, actions performed on work items or other activities that occur in a work space can be detected in real time or in near real time. In addition, users, collaborators, or select users can be notified in real time or near real-time of these actions or activities. Various mechanisms can be used to notify users or collaborators, including through the web interface to access the collaboration platform, via email, and/or SMS, for example.

In one embodiment, work items in a workspace or folder within the collaboration environment can be synchronized to workspaces or folders on a collaborator's computer.

Functions and techniques disclosed for real time or near real time notification of activities that occur in the online platform on a work item or in a work space can be performed by a push-enabled server (e.g., the notification server 150 coupled to the host server 100 of the collaboration platform. Additionally, functions and techniques disclosed for synchronizing workspaces or folders within the collaboration environment with workspaces or folders on a collaborator's desktop can be performed by a synchronization server 120. Functions and techniques performed by the host server 100, the notification server 150, the synchronization server 120 and the related components therein are described, respectively, in detail herein.

In one embodiment, client devices 102 communicate with the host server 100 over network 106. In general, network 106, over which the client devices 102 and the host server 100 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or cloud-based platform deployed in an enterprise or other organizational setting 250 for organizing workspaces 205, 225, 245 which include work items 215, 235, 255 and providing a discussion workspace area (not shown) for the respective workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, work space A 205 and a corresponding discussion workspace may be associated with work items 215, work space B 225 and a corresponding discussion workspace can be associated with work items 235, and work space N 245 and a corresponding discussion workspace can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208, and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In one embodiment, a first type of permission level, e.g. an editor, can allow a user to have full read and write access to a workspace such that the user can view and download contents of the workspace as well as upload new content to the workspace. A second type of permission level, e.g. a viewer, can allow a user to have full read access to a workspace such that the user can view and download contents of the workspace but not upload or edit contents of the workspace. A third type of permission level, e.g. an uploader, can allow a user to have limited write access to contents of a workspace such that the user can see items in the workspace but not download or view the items, while being permitted to upload new content to the workspace.

In one embodiment, the ability of a user associated with a workspace to enable synchronization of the workspace with local folders on the user's computer can be tied to the permission level of the user. Alternatively, separate synchronization permission can be assigned by a creator or administrator of a workspace to individuals associated with the workspace. In some instances, synchronization permission can be associated with the workspace or the items in the workspace or based upon any other criteria.

In each work space A, B . . . N, when an action is performed on a work item by a given user or any other activity is detected in the work space, other users in the same work space may be notified in real time or in near real time. Activities which trigger real time notifications can include, by way of example but not limitation, adding, deleting, or modifying collaborators in the work space, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

The activity can be performed in relation to a discussion topic in the work space, for example, adding a response to a discussion topic, deleting a response, or editing a response in the work space. In addition, the activity is performed on a work item in the work space by the user, including, by way of example but not limitation, download or upload of a work item, deletion of editing of the work item, selecting, adding, deleting, and modifying a tag in the work item, preview of the work item or comment of the work item, setting or changing permissions of the work item, sharing a work item, emailing a link to the work item, and/or embedding a link to the work item on another website.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
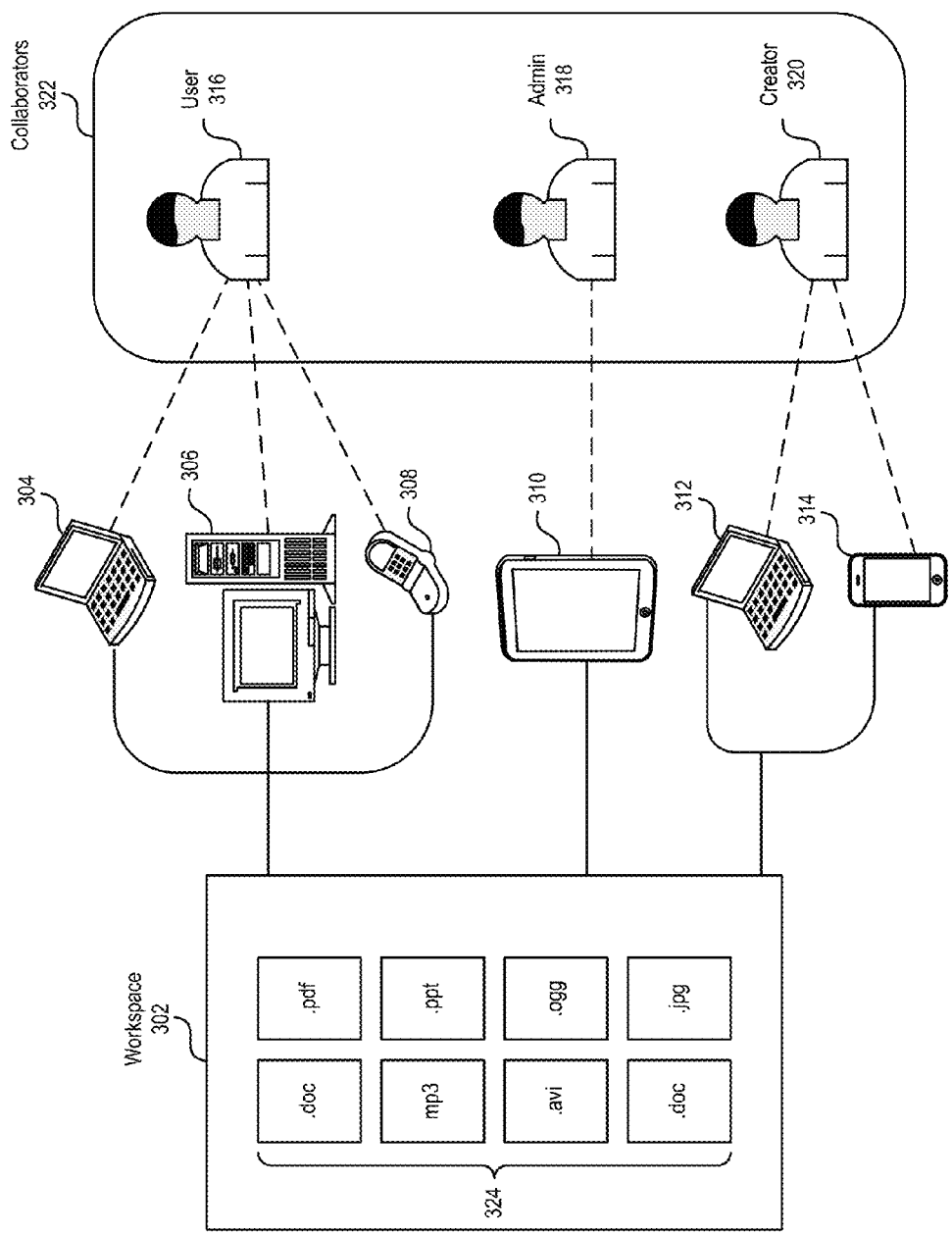
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Work items hosted by a collaboration environment (e.g., a cloud-based collaboration environment) can be accessed by users (e.g., users 316, 318, and 320) via multiple different devices (e.g., devices 304-314) for viewing, editing, processing or performing other manipulations on work items. The devices can include applications for accessing a server hosting a cloud-based platform or service or other backend web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism are generally insecure, and any data passed between applications are visible to all other application on a device.

Hosting Server

Figure 4:
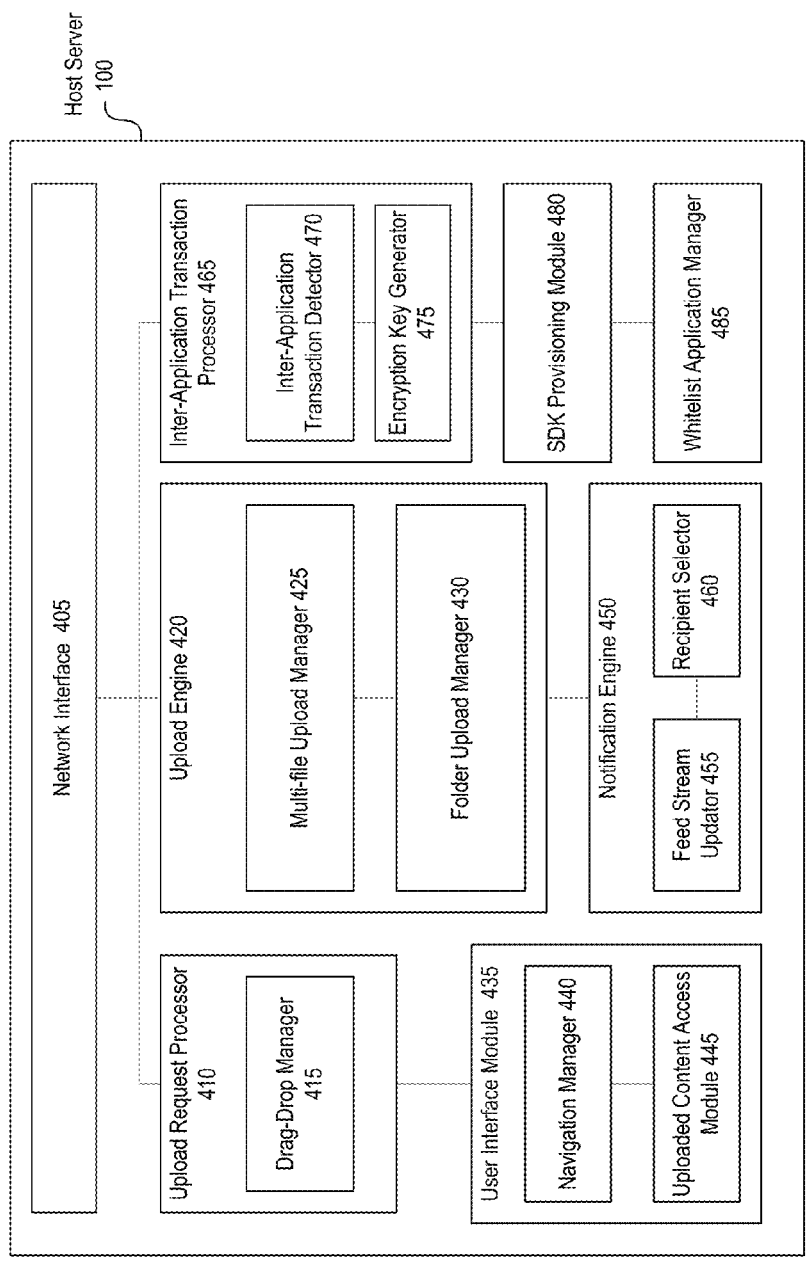
FIG. 4 depicts a block diagram illustrating an example of components in a host server for cloud-based services and storage accounts accessible via a sending application in a mobile device.

FIG. 4 depicts a block diagram illustrating an example of components in a host server 100 for cloud-based services and storage accounts accessible via a sending application, e.g., on a mobile device.

The host server 100 of the web-based or cloud-based environment can generally be a cloud-based service. The host server 100 can include, for example, a network interface 405, an upload request processor 410 having a drag-drop manager 415, an upload engine 420 having a multi-file upload manager 425 and/or a folder upload manager 430 and a user interface module 435 having a navigation manager 440 and an upload content access module 445. The host server 100 can also include, for example, an inter-application transaction processor 465 having an inter-application transaction detector 470 and an encryption key generator 475. One embodiment of the host server 100 can also include an SDK provisioning module 480 and a white list manager 485. Another embodiment of the host server 100 further includes a notification engine 450 having, for example, a feed stream updator 455 and/or a recipient selector 460. Additional or less components/modules/engines can be included in the host server 100 and each illustrated component.

The network interface 405 can be a networking module that enables the host server 100 to mediate data in a network with an entity that is external to the host server 100, through any known and/or convenient communications protocol supported by the host and the external entity. The network interface 405 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

One embodiment of the host server 100 includes the upload request processor 410 which can receive, detect, process, identify, parse, translate, and/or determine an activity request. An upload request can be submitted by a user through a user interface of the collaboration platform to upload one or multiple items.

The user can identify the files, content, or work items to be uploaded to the host server 100 one-by-one and queue up multiple items (e.g., including but not limited to files, folders, documents, images, audio, etc.) to be uploaded in a single request. The user can also select all of the items to be uploaded in a single action (e.g., via highlighting or otherwise selecting of icons corresponding to each of the items). In one embodiment, the upload request is generated via a drag-and-drop action of the multiple work items to be uploaded to the host server into a portion of a user interface. Drag-and-drop activated uploaded requests can be detected, handled, received, processed, and/or otherwise managed by the drag-drop manager 415.

In one embodiment, the upload request is generated via a drag-and-drop action of a single folder which includes the multiple work items to be uploaded to the host server 100. For example, the upload request can be generated when a folder having the multiple items on a client device that is to be uploaded is identified through the user interface. In some instances, the folder can include additional folders in a folder hierarchy of multiple items.

In some instances, the user can generate an upload request by activating the upload feature in a tab on a user interface and initiate uploading by selecting (e.g., clicking on or otherwise activating) a button/tab. Once selected, another user interface or a pop-up window may appear allowing the user to navigate through files or folders to select the items to be uploaded.

Once upload requests have been detected and processed, the upload engine 420 can upload the requested item or multiple requested items. The upload engine 420 can, in one embodiment, upload a single item or multiple items (e.g., sequentially or simultaneously) to the host server 100. A multiple item upload may be initiated via a single-step or multi-step user request. A multi-file upload request can be handled, processed, and executed, for example, through the multi-file upload manager 425.

In one embodiment, the multi-file upload manager 425 receives an identification of each of the multiple files to be uploaded (e.g., from the upload request processor 410) and sequentially prepares each individual file for uploading and uploads each file independently. For example, the upload manager 425 can compress one of the multiple files individually, upload it to the host server 100 and decompress the file when uploaded and proceed to perform the same steps with the next file. Preprocessing a file can include, for example, analyzing the file size and type to determine if it is acceptable/valid and/or to identify how best to compress the file. Post-processing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 100. The upload may automatically progress from one file when completed to the next one in sequence when the user initiates a multi-file upload request.

In one embodiment, the upload engine 420 uploads multiple items in a folder hierarchy based on a single request to upload a folder which has a hierarchy of folders inside, for example, via the folder upload manager 430. In one embodiment, the folder upload manager compresses the multiple items in the folder hierarchy in a single process into a single item and uploads the single item in a single upload process (rather than one by one) to the host server 100. After the merged file of multiple items has been uploaded, the folder upload manager 430 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

One embodiment of the host server 100 includes a notification engine 450. The notification engine 450, can for example, update a feed stream to include an updated feed indicate that an item or multiple items have been uploaded, for example, via the feed stream updator 455. The users that are notified can be selected, for example, by the recipient selector 460, and can include collaborators or the user, or other users meeting a criterion. In some instances, the feed stream is updated in real time or near real time relative to when the upload of the item completed. For real-time updating, the notification engine 450 can utilize another server, or another engine in the same server which provides push functionality.

The notification engine 450 can generally notify users, which can be collaborators of the user who performed the activity in the work space via one or more of many mechanisms, including but not limited to, email, SMS, voice-message, text-based message, RSS, feed, etc.

In one embodiment, the notification is depicted through a web-browser used by the other user to access the web-based collaboration environment, for access in real time or near real time to when the activity was performed by the user. When notifying a user in real time through a web-browser, the notification engine 450 can utilize a push-enabled service to ensure real time notification. In one embodiment, the notification is sent by a component or another server which implements push technology (e.g., the notification server 150 shown in the example of FIG. 1). The push-enabled service can be implemented via long poll or HTTP streaming, for example, by the notification server 150 or another component, device which may be internal to or external to the host server 100. In addition, the host server 100 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.).

One embodiment of the host server 100 includes the user interface module 435, which preserves or enhances user experience before, during, or after an upload request. For example, the user interface module 435 can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 440 in the user interface module 435. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 100. Navigation between pages during an upload of multiple files can also be managed by the navigation manager 440. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 100 available for access through the user interface, even when some of the multiple items have not yet been uploaded to the host server, via the upload content access module 445, for example. Thus, during an active upload, individual files which have completed uploading can be accessed or interacted with by the user in the collaborative environment without having to wait for the full upload to complete.

In some instances, the item which has been uploaded to the host server may be manipulated by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

One embodiment of the host server 100 can include an SDK provisioning module 480 and a whitelist application manager 485. The SDK provisioning module 480 can provision SDKs, API keys/tokens, and the like to applications that have been approved for integration with the sending application. The SDK can include some methods, iconography, and the like that allow inter-application communication and make the inter-application communication capability apparent to users of both applications. For example, the SDK can recognize encoded messages broadcast by the sending application (e.g., the cloud-based collaboration platform application) and include response to method calls to facilitate various data access and transfer scenarios discussed above.

Applications that have integrated with the sending application by implementing the SDK, can be designated as a whitelisted application by the whitelist application manager 485. The whitelisted applications can receive automatic notifications of updates to SDKs, can make API calls to the host server, receive and respond to custom Intents, and the like.

In one embodiment of the host server 100, the inter-application transaction processor 465 can include an inter-application transaction detector 470 and an encryption key generator 475. The inter-application transaction detector 470 can detect an inter-application transaction request from the sending application and/or the receiving application. The transaction request may or may not involve file transfer. For example, if the transaction request is for the launch of the receiving application, no file transfer may be involved. The inter-application transaction processor 465 may not take any further steps where no file transfer between applications is involved. However, if the transaction request is to open a file in the receiving application, the inter-application transaction detector 470 may detect it as such, and trigger the encryption key generator to generate an encryption key for encrypting/decrypting the file in transit. In one implementation, the inter-application transaction detector 470 can detect the transaction request based on the encryption key request from the sending application. In one implementation, the inter-application transaction detector 470 can also determine whether a transaction request requires a new encryption key and if so, can trigger the encryption key generator 475 to generate and send a new encryption key. For example, in one implementation, each transaction request involving a file transfer may require a new encryption key. In another implementation, a new encryption key may be required for the first transaction, and the next few transactions may not require a new key. In other implementations, a new encryption may be required for each new session with the requesting application, after expiration of a predefined time period, for each receiving application involved in a transaction, and the like.

In one embodiment, the encryption key generator 475 can generate and send to the requesting application an encryption key for encryption one or more files. In one implementation, the encryption key may have an associated time stamp which can be used to determine the expiration date/ time. The encryption key, in one implementation, can be an auth token, a hash of an auth token with or without a time stamp, and the like.

Features of Encryption System Embodiments:

Various of the disclosed embodiments contemplate encryption procedures to facilitate security in a synchronization and/or collaboration architecture, e.g., such as described above with reference to FIGS. 1-4. In some embodiments, the encryption process includes an upload encryption operation and a download decryption operation. Some of the operations may be mediated by a server, referred to herein as an Interval Key Server (IKS). Note that in some embodiments the IKS may be located on the host server 100, be integrated with the host server 100 (e.g. expanding on the functionality of encryption key generator 475), or be in communication with the host server 100.

Figure 5:
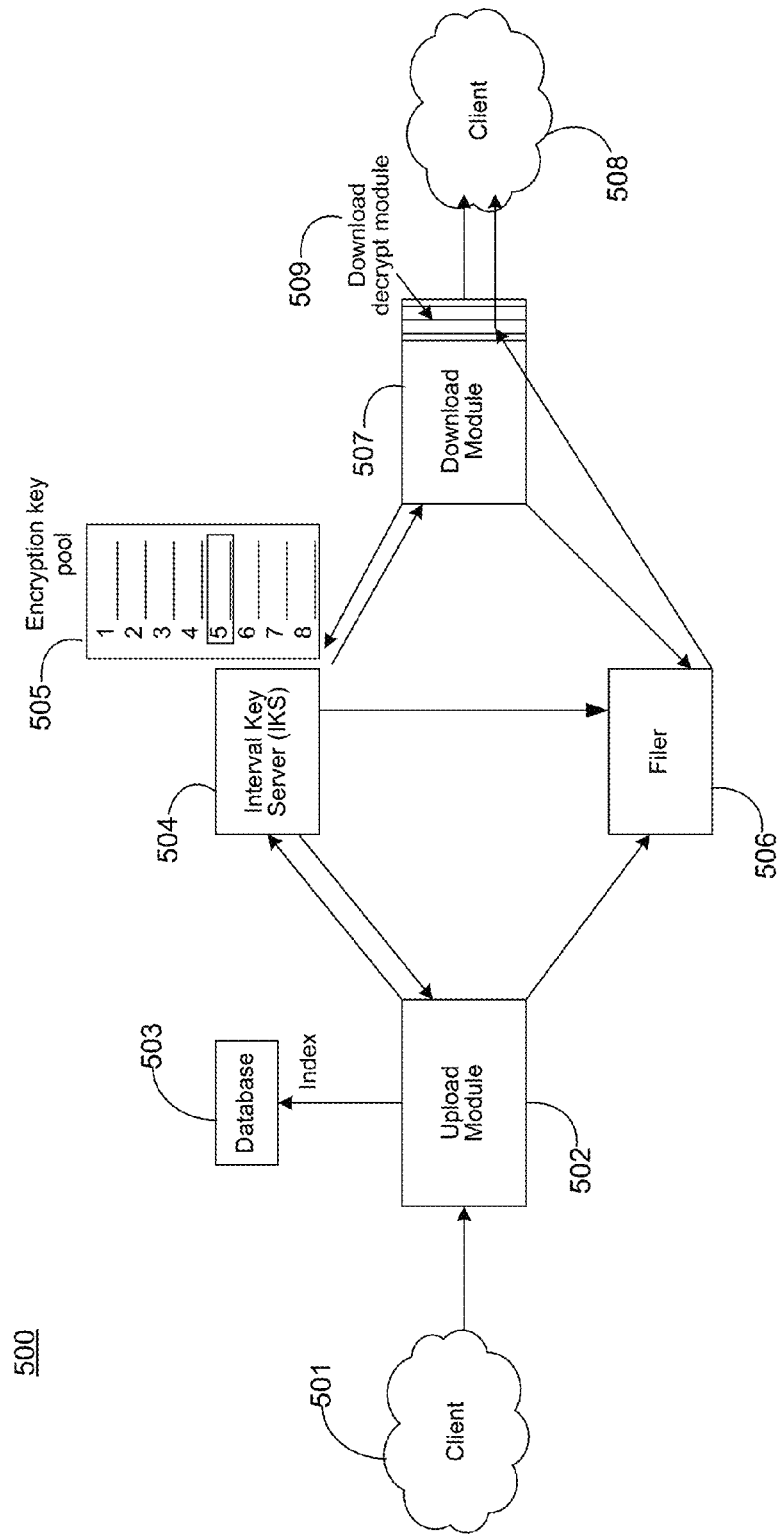
FIG. 5 depicts an example diagram of a network environment wherein upload and/or download streaming encryption to/from an online service, or cloud-based platform or environment may occur in some embodiments.

FIG. 5 depicts an example diagram of a network environment wherein upload and/or download streaming encryption to/from an online service, or cloud-based platform or environment may occur in some embodiments.

A client 501, e.g. a collaborator 108 operating a client device 102, may desire to upload a file via an upload module 502. The upload module 502 may be in communication with a database 503. The upload module 502 may also be in communication with an interval key server (IKS) 504 and a filer 506. The IKS 504 may include an encryption key pool 505. Encryption key pool 505, in conjunction with a system of headers described in greater detail below, may be used to improve key circulation and to recover from key compromises by adverse parties. The filer 506 may be any suitable storage location known in the art. A download module 507 may itself include a download decrypt module 509 which may communicate materials to client 508. Client 508 may be the same or different as client 501, for example the clients may be different collaborators within a group.

In some embodiments, the data stored in the database 503 is the identifier of the encryption key from the key pool 505. This database may be populated at block 606 as described in greater detail below. The identifier may be encoded into the ENC2_message and may be used to retrieve the keypool's 505 encryption key. In some embodiments, this may occur following block 703 and before 704. In some embodiments, the entry in the database is only used for the rekey process, such as the example described in 800, to identify all files whose DEK was encrypted using that secondary key.

Figure 6:
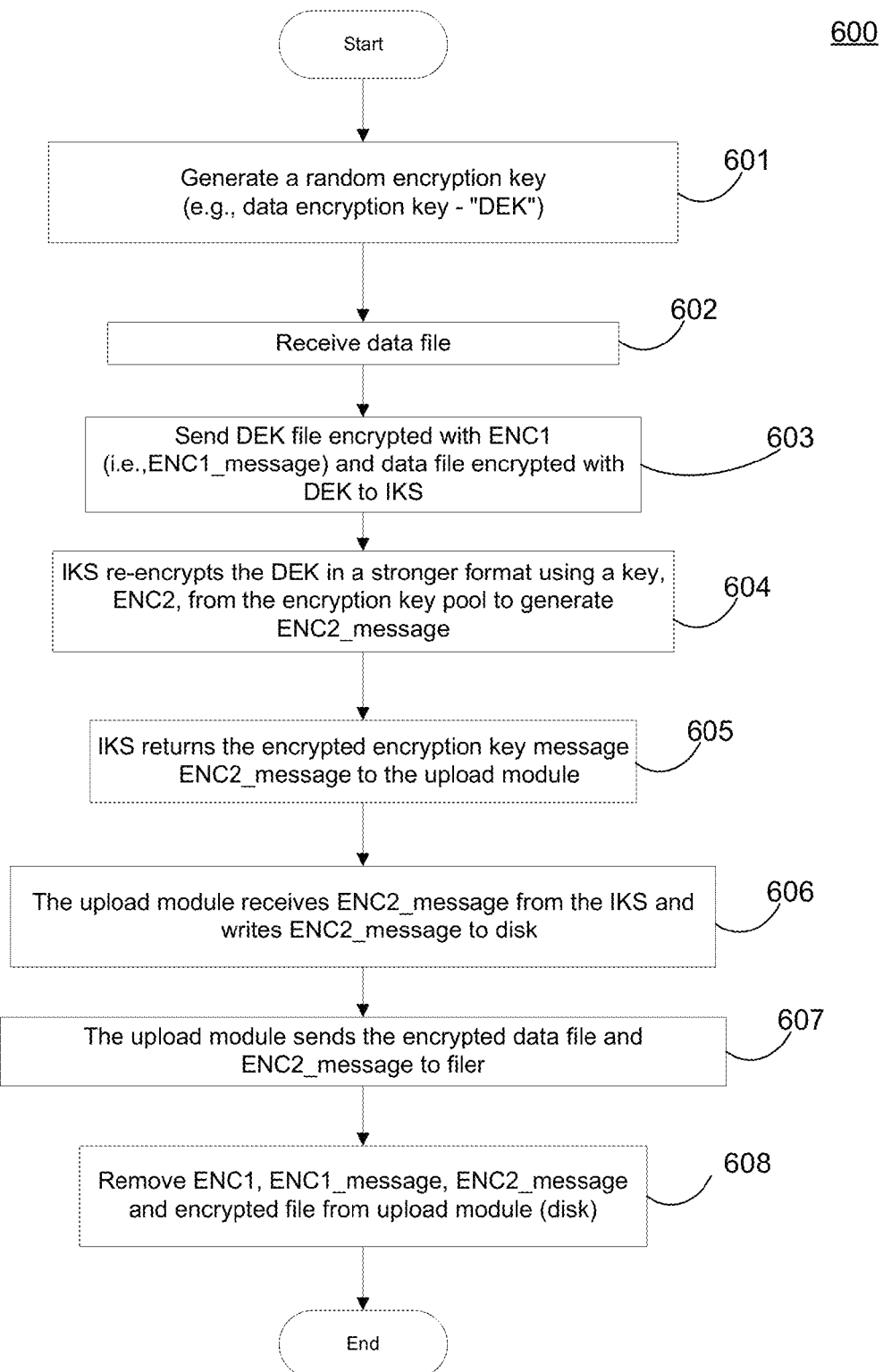
FIG. 6 is a flow diagram depicting some steps that may occur in some embodiments of the upload encryption process.

Encryption Upload Embodiments:

FIG. 6 is a flow diagram depicting some steps that may occur in some embodiments of the upload encryption process 600.

At step 601 the system may generate a fully random key (data encryption key, referred to as DEK herein) for the file to be uploaded. The DEK may be 32 or 64 bytes of random data in some embodiments. The DEK may be used in AES256 CTR mode encryption of the file data. Thus, the DEK may represent the "file encryption" key, whereas the other keys referred to herein consider transactional keys for improving security.

The Data Encryption Key may travel in a file of the following form in some embodiments:

```
1 encrypted blob of
{
version identification string
some padding
the DEK itself
}
```

Version identification may be used, in conjunction with the key encryption pool 505, to redistribute a new keyset following a key, or other security, compromise. The DEK may be locked (e.g., encrypted) temporarily using a weaker key in some embodiments. The weaker key is referred to herein as "ENC1" and may be stored at the upload module 502, e.g. on a disk. The key ENC1 may not necessarily be "weaker" than the DEK in the sense that it is smaller, although that may be the case. Rather, the ENC1 key may be known throughout the system, and accordingly more readily compromised than the DEK. In this sense, because of its pervasive nature, the ENC1 is "weaker" than the DEK.

The upload module may communicate with database 503 to find every file which was encrypted by the index, e.g. using a key identifier. This may occur at the end of the encryption process in some embodiments. As described in greater detail below, headers may be used to identify the keys previously used to encrypt files. New keys may be introduced into circulation and replace previous keys used to encrypt files in some embodiments as described in greater detail herein. For example, where a user's account becomes compromised, or a malicious employee divulges key pairings, the system can redistribute a new key from the key pool for reencryption of each of the files.

At step 602, the encryption system operating at the client system 501 may receive a file for upload, e.g. directly from a collaborator or from an automated process on the collaborator's computer. In some embodiments, as the bytes of the upload file arrive at the encryption system, the bytes may be stream encrypted simultaneously using the previously generated encrypted random key (e.g., by the data encryption key DEK). In this manner the file may arrive on the disk in an encrypted format. In one example, the encryption process used can be a standalone binary, written in C, based on cryptography libraries. At this point, there may be two files: a key file (referred to herein as ENC1_message) containing the DEK encrypted with the key ENC1; and the data file encrypted with DEK. In some embodiments, these two files may be merged into a single file, or into a single data transmission stream.

Following creation of these files, some embodiments then seek to perform various processing such that the data file is seamlessly uploaded to a user's account. For example, at step 603, the encryption system may contact the IKS server 504 and send the encrypted key file (ENC1_Message) to the IKS server 504, e.g. via an HTTP POST action. At step 604, the IKS server 504 may then take the encrypted key file apart (e.g., extract/decrypt the original random key DEK), and re-encrypt the DEK in a stronger format using one of a set of keys from an encryption key pool 505. The second key retrieved from the encryption pool is referred to as "ENC2" herein and the file generated by encrypting the DEK with ENC2 referred to herein as "ENC2_Message". The keys at the encryption key pool 505 may only exist on the IKS server 504 in some embodiments. The encryption pool keys may be generated locally at the IKS server 504 in a secure manner and independently managed. In some embodiments, different methods may be used to generate different of the encryption pool keys to ensure that the compromise of one key will not facilitate the comprise of another key. Correlations between the keys and their use may be reduced to further complicate discovery of keys.

In some embodiments, key encryption keys (ENC2s) for the key pool 505 may be generated offline by running a script. The script may require a password, which may be put through a Password Based Key Derivation Function to produce an encryption key, which may be used to decrypt the existing key pool. Some number (N) of new keys may then be generated using a pseudorandom number generator seeded from system entropy. These new keys may be appended to the original list and encrypted (in some embodiments entirely in memory) using the password-based key mentioned above. The new keys may then be written back to disk as a new key pool file.

One example of the format for generating ENC2_Message is: ENC2_Message=(Data encryption key (DEK) (ENC1+checksum (ENC1), index). The term "index" as used here will be understood to refer the identifier for the keypool key. That is, ENC2_Message may be generated by renencrypting DEK using a key ENC2 from the key pool, where the key ENC2 from the key pool is selected based on its index. The index may itself be chosen based on the original key ENC1, for example, by taking a checksum of the key and using the checksum modulo the size of the key pool to identify an encryption pool key index. One will regularly recognize a multitude of methods for selecting index, many of which are less susceptible to cryptanalysis.

In some embodiments, the message ENC2_Message may be in the following form:

```
version id
key_id
encrypted blob {
DEK
md5(DEK)
}
```

The encrypted blob in this case is encrypted with the key ENC2 that key_id refers to within the encryption key pool 505 maintained by IKS server 504. The fields "version id" and "key_id" may be stored in plain text at the start of the file in some embodiments. As discussed above, the version may be used to determine the character of a previously encrypted file following a compromise (e.g., versions preceding a compromise date may be reencrypted with a new key). In order to generate the ENC2_message, the IKS may extract the DEK from ENC1, and then produce an ENC2_message from scratch as described above.

At step 605, the IKS server 504 may return ENC2_message (or ENC2 itself in some embodiments) to the upload module 502, e.g., as a response to the POST request. At step 606, the upload module 502 may write ENC2_message (or ENC2 itself in some embodiments) to disk. At this point, the upload module 502 may have the following files: the original key file (e.g., ENC1_message, DEK encrypted using ENC1), the encrypted data file (encrypted with DEK), and the newly encrypted key file (ENC2_message, DEK encrypted using ENC2). In some embodiments, the system may transfer ENC2_message without writing to disk, as part of a transient messaging operation.

At step 607, the encrypted data file may then be transferred to a storage location (e.g., the filer 506), along with the IKS encrypted key file (ENC2_message). Thus, ENC1_message may be discarded and ENC2_message may be sent to permanent storage, in some embodiments. In some embodiments, ENC1_message may have been encrypted with a static key (ENC1), which if compromised may not be able to be changed (or doing so would require every key file in the system to be re-encrypted).

At step 608, the intermediate stage files (e.g., the encrypted data file, the key ENC1) may then be removed from the upload module 502.

Encryption Download Embodiments:

Following a file upload, the client's data file may now be securely stored on the remote server. For the client or a collaborator to subsequently retrieve the file, they may then initiate a download request to acquire and decrypt the stored information.

Figure 7:
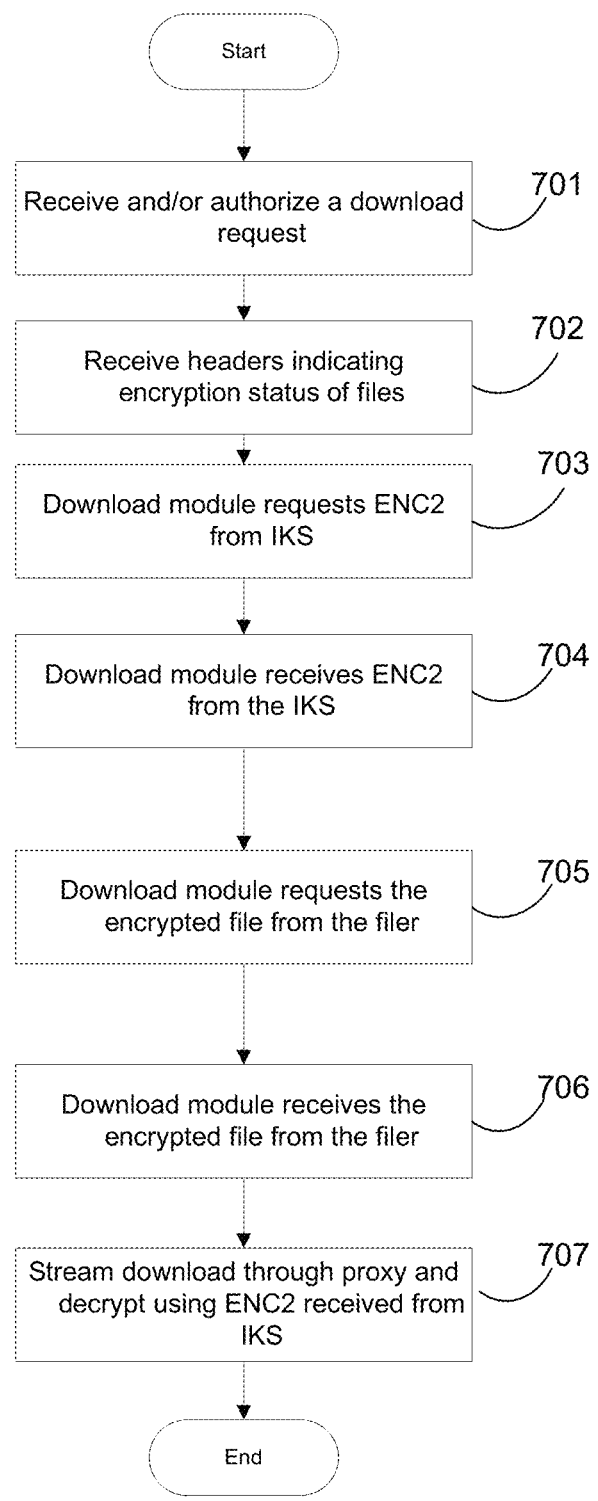
FIG. 7 is a flow diagram depicting some steps that may occur in some embodiments of the download decryption process.

FIG. 7 is a flow diagram depicting some steps that may occur in some embodiments of the download decryption process 700. In some embodiments, decryption for download can be implemented using a module plugin configured to operate with a reverse proxy process (e.g., a reverse proxy system such as Nginx®). In one example, the decryption module may be implemented using a plugin for Nginx®. For example, all requests to the system may be run through reverse proxies such as Nginx® in some embodiments.

In some embodiments, decryption may be initiated by detecting (e.g., by Nginx®) two special headers that may be uniquely identified by the system. These two headers may include, for example, locations for the data file and for the key file, as well as encryption key pool information. The headers may be tracked by a download module 509 in some embodiments. For example, Nginx® may detect the headers and make the two requests in some embodiments. Use of the headers may facilitate the introduction of new keys into circulation in some embodiments. In this manner, the system may identify each of a plurality of files encrypted using the same key. If a key were compromised, then every file that was encrypted with that key could be identified and re-encrypted with a suitable replacement key.

At step 701, the client system may receive and/or authorize a download request. In many embodiments, this step may be preceded by an authentication to verify that the requesting user has the privileges necessary to perform the download. After a download request has been made and the authorization has been approved, the IKS or filer server handling the request may respond to the reverse proxy server (e.g., the Nginx) with a response including two headers at step 702.

Receipt of these two headers may trigger the reverse proxy module (e.g., download decrypt module) to make requests (e.g., HTTP sub-requests) for the file and for the key ENC2, e.g. from the IKS server 504. The request for the file may be sent directly to the filer and fetched by the decryption module 509 that performs the streaming decryption. The request for the key ENC2 may then be sent to the IKS server, at step 703. For example, the headers may include fields that appear as follows:

x-decrypt: http://boxfiler101.ve.box.net/2011/some/path/to/file.enc
x-decrypt-metadata: http://boxfiler101.ve.box.net/2011/some/path/to/file.meta In these examples the fields specify that the decrypt key may be found at a file path on the server "boxfiler101.ve.box.net". Similarly, the second field specifies that the decryption metadata may be found at a file path on the server "boxfiler101.ve.box.net". This server may be the filer 506 in some embodiments. Though depicted as the same server in this example, one will recognize that the data may be distributed across a plurality of servers. For example, the server "boxfiler101.ve.box.net" may be the IKS server 504 in some embodiments and the x-decrypt and x-decrypt-metadata materials may refer to different servers.

When the module 507 detects these two headers, or receives a related indication of availability, it may request for the key ENC2 from the IKS 504 at step 702 and request the encrypted file (e.g. the data file encrypted with DEK) from the filer 506 at step 703. These two requests may be one or more GET or POST requests in some embodiments. For example, the module 507 may execute, e.g., using a GET request to the following URL:

http://iks.prod.box.net:5397/boxfiler101.ve.box.net/
2011/some/path/to/file.meta Here, "iks.prod.box.net" may be the IKS server 504. The URL may point directly to the key ENC2 from the encryption pool. In some embodiments, a server-side script may be available on the IKS server 504. The script may receive an index, or other indicator associated with the corresponding ENC2 from the module and may return the corresponding ENC2 in reply at step 704. After receiving the IKS response, the module 507 may make the request to the filer 506 for the encrypted file, e.g., using a GET request to the following URL, at step 705:

http://boxfiler101.ve.box.net/2011/some/path/to/file.enc

Here, "boxfiler101.ve.box.net" may refer the request to the filer 506. After requesting 705 and receiving the data file encrypted with DEK, at step 706, the download module may decrypt the data coming back from the filer 506, using the key ENC2 provided back from IKS 504. At step 707, the module may stream the decrypted data to the user (e.g., there may be simultaneous streaming and decrypting in some embodiments).

Note that the location of the file may be encoded into the URL request in some embodiments. The IKS 504 may respond to a key file fetch by the download module 507 in various manners in different embodiments.

In some embodiments, the download server 507 will request the encrypted file data from the filer 506, as described above, but it is the ENC1_message that is requested from the IKS 504 (e.g., the metadata information, .meta==ENC1_message). For example, the URL example given above (ending with ".meta") is for an ENC1_message. When the IKS 504 receives this request it may send a request to the filer location specified in the URL (boxfiler101 in this example) for the ENC2_message. In this example, the IKS 504 may then append the number "2" to the string it identifies in the URL, turning .meta into .meta2 (.meta2==ENC2_message). When the IKS 504 receives the ENC2_message from the filer 506 the IKS 504 may decrypt it using the identified key. In some embodiments, using a URL format as described means that the IKS servers can be stateless. For example, they don't have to know where any files are stored, they just use the received values as a starting point (appending "2" to the received value to locate the file). When the download server 507 receives back the ENC1_message it requested, it may have the ENC1 key to decrypt it and turn it into a DEK.

In this manner, the request from the download server 507 need not be configured to anticipate a difference between any key file format (e.g., ENC2_Message or ENC1_Message). Rather, the IKS 504 may make the determination for how to service that request. Thus, though the example "2" suffix was discussed above, the system may fetch the key data in whatever embodiment necessary and decrypt the data into the appropriate DEK.

In some embodiments, the operations on IKS server 504 may be written using Python. In some embodiments, IKS server 504 may be a standalone server based on an event-driven networking engine (e.g. an event-driven network programming framework such as the Twisted open source framework) and may incorporate some available Python cryptography libraries.

In some embodiments it may be desirable for the IKS server 504 to not require extensive and ongoing configuration and reconfiguration. Minimal interaction with IKS server 504 by human users may mitigate the likelihood that the keys are compromised. Accordingly, the disclosed embodiments may improve security by facilitating greater isolation of the IKS server 504.

In some embodiments, the IKS server 504 can process two sorts of requests: GET and POST requests. In some embodiments, POST requests may include an in-memory transformation of a key file (ENC1) from one format, to another (e.g., ENC2). The new format may be locked with a key that exists only on the IKS server (using ENC1 to produce ENC2 on the upload side). On the download side of the process, the GET request may require the IKS server 504 to retrieve the key file (ENC2) that was stored on disk on the IKS server (e.g., the IKS fetches ENC2 and determines the corresponding ENC1 to be sent to the download module, using the index). The location of the key (ENC2) can be provided to the IKS by means of the URL itself in some embodiments. For example, the form of the request may be:

http://iks.prod.box.net:5397/boxfiler101.ve.box.net/
2011/some/path/to/file.meta In some embodiments, when this URL is parsed by the IKS server 504, the server is looking for a resource named: /boxfiler101.ve.box.net/2011/some/path/to/file.meta. The resource may be provided as a suffix to the request as indicated above.

The IKS server 504 may then request the keyfile (ENC2) and perform the unlock operation. For example, the IKS server 504 may use the index to the key stored only in the key pool 505 to determine ENC2. Once ENC2 has been recovered, the IKS server 504 may provide the key (ENC2) to the requesting download server, e.g. the server housing download module 507. Performing the operations in this manner may allow minimization of the amount of change needed in both the download module 507 (e.g., Nginx® plugin module) and the IKS server 504 in order to support new storage locations in production. As mentioned, this reduced interaction may also improve security.

Thus, behavior of both upload and download systems may be controlled by manipulating the special headers that are provided in a response to the download request. These headers may be intercepted by the download module 507 (e.g., Nginx plugin). Detecting the headers may precipitate the rest of the above-described operations "behind the scenes", so that file access appears transparently from both the upload and download perspective. As one benefit of some embodiments, the encryption and decryption processes may be configurable by making changes only in the web application code, e.g. an implementation in PHP or other backend software. In some embodiments the two special headers may not be returned to the user and rather exist as a control system for internal use.

Encryption Key Pool Response and Recovery

Figure 8:
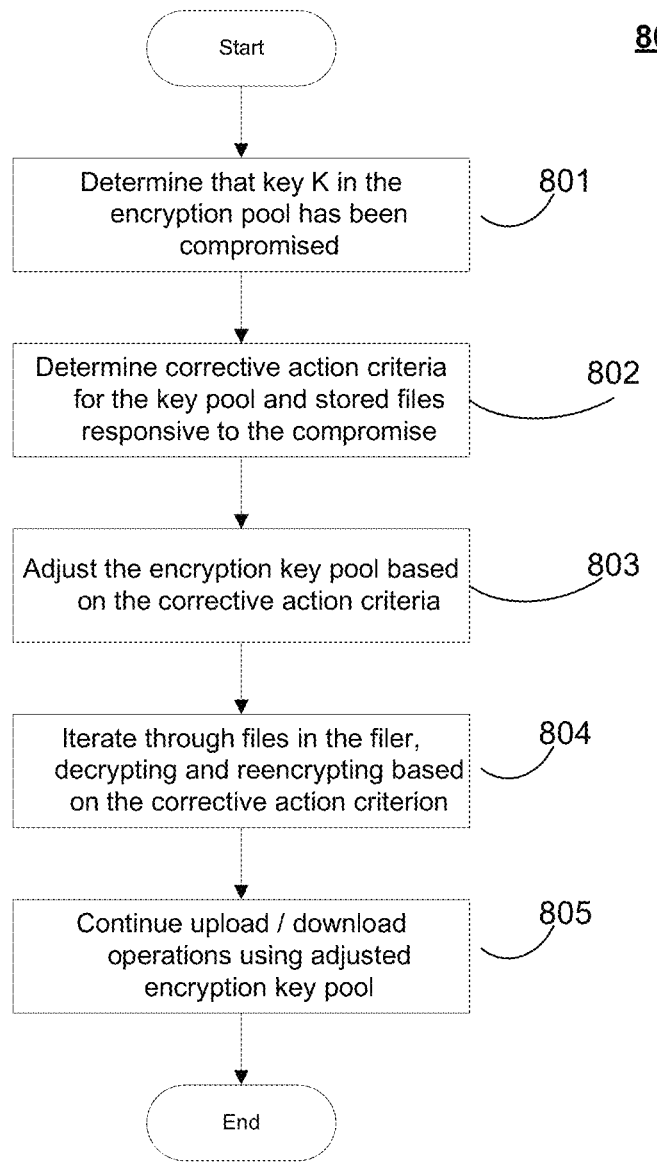
FIG. 8 is a flow diagram depicting some steps in a key compromise and recovery process as may be implemented in some embodiments.

FIG. 8 is a flow diagram depicting some steps in a key compromise and recovery process 800 as may be implemented in some embodiments. At step 801, the system, e.g. via an administrator managing IKS server 504, may discover that a key "K" from the encryption pool has been compromised. For example, a malicious client or collaborator, may seek to retrieve data from the filer and infer the key ENC2 with which the DEK is encrypted. After discovering the compromise, the administrator, or the system, may automatically initiate the remainder of the recovery process 800.

At step 802, the system or administrator may determine the corrective action criteria for the encryption key pool which is responsive to the compromise. For example, if the malicious user has discovered an encryption key K in the encryption key pool, the system may determine that all keys generated prior to the generation of key K may likewise be suspect, depending upon the character of the malicious user's compromise. In response, the criteria may specify not only that files whose DEK is encrypted with ENC2 should have their DEK reencrypted with a new key from the encryption key pool, but that all files with encryption pool keys preceding K be reencrypted as well. Similarly, if the comprise is such that a plurality of DEK's may now be accessed by the malicious user, the criteria may specify that a new DEK be generated for the corresponding files, the files reencrypted with the new DEK, and new ENC2_messages be generated with the new DEK.

At step 803, the system, e.g. the IKS server 504, may adjust the encryption pool based on the corrective action criteria. For example, where key K and all preceding keys are suspected of compromise, the system may remove all of these keys and replace them with freshly generated keys.

At step 804, the system, e.g. the IKS server 504, may iterate through files in the filer 506 decrypting and reencrypting as specified above to implement the determined corrective action criteria. The system may refer to the file headers or to a locally stored table to identify which files are encrypted with which keys from the encryption key pool.

Once the corrective actions have been taken, at step 805, the system, e.g. the IKS server 504, may resume upload and download encryption/decryption as described previously using the new keys.

In some embodiments, in the event that some set of keys (ENC2s) are determined to be compromised they may not actually be removed from the system. Rather, the system or administrator may re-key all the DEKs which were encrypted with those keys, as described above. The system or administrator may also disallow those compromised keys from ever being used to encrypt any new files. Thus, the effect would be that although the keys are still in the keypool, there are no files anywhere whose DEKs are encrypted using those keys.

One will recognize various ways to disallow keys to be used for new files. For example, the keypool format may contain an additional bit for each key indicating whether it can be used for encrypting new files, or only for decrypting existing files. When new keys are generated, e.g. using a script as discussed above, the bit may be set on all previous keys so that only the most recent keys can be used for new files. As this may be done on a regular basis, the effect may be that each ENC2 (key encryption key) is only used for a small portion of the total files.

This approach may have many benefits. For example, if any ENC2 is compromised it may only be necessary to re-key that small portion of all the file's DEKs (though some embodiments may elect to re-key more than that). That portion of the files may be identified by looking in the database for all files whose DEK is encrypted with a given key.

Figure 9:
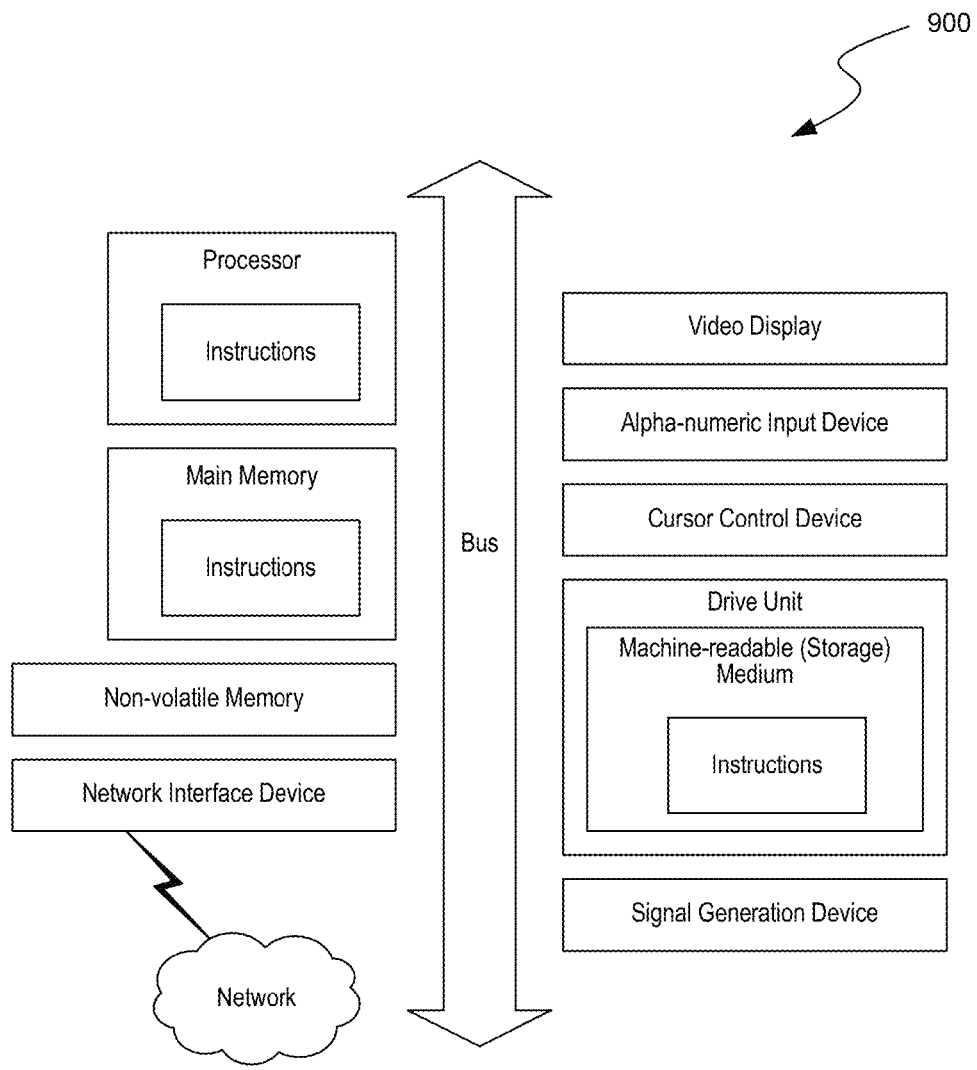
FIG. 9 shows a diagrammatic representation of a machine in the example form of a computer system within which a set of instructions for causing the machine to perform any one or more of the methodologies discussed herein may be executed.

FIG. 9 shows a diagrammatic representation of a machine 900 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 900 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Remarks

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes some embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing some features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While some aspects of the disclosure are presented below in some claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A computer-implemented encryption method for recovering from a compromised key included in an encryption key pool in a cloud-based collaborative platform comprising:

identifying a plurality of data files, the plurality of data files encrypted with a first plurality of encryption keys, wherein the first plurality of encryption keys are included in the encryption key pool;

determining a plurality of encryption key files, wherein the plurality of encryption key files are generated by encrypting the first plurality of encryption keys with the compromised key, wherein the compromised key is included in the encryption key pool;
adjusting the encryption key pool by:
   removing the compromised key from the key pool and generating a new key in the encryption key pool;
adjusting the plurality of encrypted data files by:
   decrypting the data files using the compromised key and
   reencrypting the data files using the new key; and
adjusting the plurality of encryption key files by: decrypting the plurality of encryption key files using the compromised key and
reencrypting the first plurality of encryption keys using the new key,
wherein, the plurality of data files are accessed by and/or collaborated upon among multiple users or collaborators in the cloud-based encryption platform.

2. The computer-implemented method of claim 1, wherein the new key is generated using a method that is different from a method used to generate the compromised key.

3. The computer-implemented method of claim 1, wherein adjusting the encryption key pool includes:
   looking up a table storing entries that identifies mappings between the plurality of data files and the first plurality of encryption keys.

4. The computer-implemented method of claim 1, wherein the new key includes a bit position set to zero.

5. The computer-implemented method of claim 1, wherein each key in the first plurality of encryption keys includes a bit position set to one.

6. An apparatus for recovering from a compromised key included in an encryption key pool in a cloud-based collaborative platform, wherein the apparatus includes a hardware processor configured to perform the steps of:
   identifying a plurality of data files, the plurality of data files encrypted with a first plurality of encryption keys, wherein the first plurality of encryption keys are included in the encryption key pool;
   determining a plurality of encryption key files, wherein the plurality of encryption key files are generated by encrypting the first plurality of encryption keys with a compromised key and one or more keys in the encryption key pool that precede the compromised key, wherein the compromised key and the one or more keys are included in the encryption key pool;
   adjusting the encryption key pool by:
      removing the compromised key and the one or more keys in the encryption key pool that precede the compromised key and
      generating new keys in the encryption key pool;
   identifying one or more encrypted data files that are generated by encrypting one or more data files using the compromised key and the one or more keys that precede the compromised key;
   adjusting one or more encrypted data files by:
      decrypting the one or more encrypted data files using the compromised key and the one or more keys that precede the compromised key and
      reencrypting the one or more data files using the new keys; and
   adjusting the plurality of encryption key files by:
      decrypting the plurality of encryption key files using the compromised key and the one or more keys that precede the compromised key and
      reencrypting the first plurality of encryption keys using the new keys,
   wherein, the plurality of data files are accessed by and/or collaborated upon among multiple users or collaborators in the cloud-based encryption platform.

7. The apparatus of claim 6, wherein the new keys are generated using a method that is different from a method used to generate the compromised key.

8. The apparatus of claim 6, wherein adjusting the encryption key pool includes:
   looking up a table storing entries that identifies mappings between the plurality of data files and the first plurality of encryption keys.

9. The computer-implemented method of claim 6, wherein each of the new keys includes a bit position set to zero.

10. The computer-implemented method of claim 6, wherein each key in the first plurality of encryption keys includes a bit position set to one.

11. A non-transitory computer-readable storage medium storing a set of instructions which when executed by a computing system causes the computing system to perform a method of recovering from a compromised key included in an encryption key pool in a cloud-based collaborative platform comprising:
   identifying a plurality of data files, the plurality of data files encrypted with a first plurality of encryption keys, wherein the first plurality of encryption keys are included in the encryption key pool;
   determining a plurality of encryption key files, wherein the plurality of encryption key files are generated by encrypting the first plurality of encryption keys with a compromised key and one or more keys in the encryption key pool that precede the compromised key, wherein the compromised key and the one or more keys are included in the encryption key pool;
   adjusting the encryption key pool by:
      removing the compromised key and the one or more keys in the encryption key pool that precede the compromised key and
      generating new keys in the encryption key pool;
   identifying one or more encrypted data files that are generated by encrypting one or more data files using the compromised key and the one or more keys that precede the compromised key;
   adjusting one or more encrypted data files by:
      decrypting the one or more encrypted data files using the compromised key and the one or more keys that precede the compromised key and
      reencrypting the one or more data files using the new keys; and
   adjusting the plurality of encryption key files by:
      decrypting the plurality of encryption key files using the compromised key and the one or more keys that precede the compromised key and
      reencrypting the first plurality of encryption keys using the new keys,
   wherein, the plurality of data files are accessed by and/or collaborated upon among multiple users or collaborators in the cloud-based encryption platform.

12. The non-transitory computer-readable storage medium of claim 11, wherein the new keys are generated using a method that is different from a method used to generate the compromised key.

13. The apparatus of claim 11, wherein adjusting the encryption key pool includes:
   looking up a table storing entries that identifies mappings between the plurality of data files and the first plurality of encryption keys.

14. The computer-implemented method of claim 11, wherein each of the new keys includes a bit position set to zero.

15. The computer-implemented method of claim 11, wherein each key in the first plurality of encryption keys includes a bit position set to one.

\* \* \* \* \*